(12) United States Patent
Hsu

(10) Patent No.: US 6,536,698 B2
(45) Date of Patent: Mar. 25, 2003

(54) DUAL MODE TAPE RULE BLADE ARRESTOR STRUCTURE

(76) Inventor: Cheng-Hui Hsu, No. 126, Pad Chung Road, Hsin Tien City (TW)

( * ) Notice: Subject to any disclaimer, the term of this patent is extended or adjusted under 35 U.S.C. 154(b) by 46 days.

(21) Appl. No.: 09/925,376

(22) Filed: Aug. 10, 2001

(65) Prior Publication Data

US 2003/0029955 A1 Feb. 13, 2003

(51) Int. Cl.$^7$ .............................. B65H 75/48; G01B 3/10
(52) U.S. Cl. .............................. 242/381.3; 242/381.6; 33/767
(58) Field of Search .............................. 242/381.3, 381.6; 33/767

(56) References Cited

U.S. PATENT DOCUMENTS

| | | | |
|---|---|---|---|
| 5,531,395 A | * | 7/1996 | Hsu ........................ 242/381.6 |
| 6,167,635 B1 | * | 1/2001 | Lin ............................. 33/767 |
| 6,272,764 B1 | * | 8/2001 | Lin ............................. 33/767 |
| 6,276,071 B1 | * | 8/2001 | Khachatoorian ......... 242/381.3 |
| 6,463,670 B1 | * | 10/2002 | Usami ........................ 33/767 |
| 6,467,182 B2 | * | 10/2002 | Usami .................... 242/381.6 |

* cited by examiner

*Primary Examiner*—John M. Jillions
(74) *Attorney, Agent, or Firm*—Rosenberg, Klein & Lee

(57) ABSTRACT

A dual mode tape rule blade arrestor structure that provides for an effective increase in tape rule rewind buffering to prevent excessive blade retrieval speeds that generate high impact sheering forces. The arrestor button of the present invention is pressed upward to temporarily halt tape rule rewinding, but can at the same time also be pressed downward and locked into the full constraint position. As such, the improved structure of the invention herein enhances tape rule service life as well as operating safety.

1 Claim, 5 Drawing Sheets

DUAL MODE TAPE RULE BLADE ARRESTOR STRUCTURE

BACKGROUND OF THE INVENTION

1) Field of the Invention

The invention herein relates to a dual mode tape rule blade arrestor structure that provides for an effective increase in tape rule rewind buffering to prevent excessive blade retrieval speeds that generate high impact sheering forces; the arrestor button of the present invention is pressed upward to temporarily halt tape rule rewinding, but can at the same time also be pressed downward and locked into the full constraint position; as such, the improved structure of the invention herein enhances both tape rule service life and operating safety.

2) Description of the Prior Art

A conventional tape rule is internally comprised of a tape rule blade reel that consists of a center-wound spiral spring at the interior section and a tape rule blade wound around the exterior section, with a hook riveted to the front end of the tape rule blade and the center section of the said tape rule blade reel spiral spring sleeved over a center shaft of a left case half; the front end of the tape rule blade is inserted through a bumper block which is secured by a fastening tab at the bottom section and front end of the left case half and the other side of the bumper block is secured by a fastening tab at the bottom section and front end of the right case half; screws are respectively inserted into screw holes in the said right case half and then fastened into the center shaft and the mounting posts of the left case half to complete the assembly of the tape rule. The conventional product is utilized by pulling out the tape rule blade of the tape rule to an appropriate length during a measurement operation and then releasing the tape rule hook of the tape rule when measuring is finished; since the spiral spring (similar to the type utilized in many spring-loaded mechanisms) inside the tape rule is capable of automatically rewinding the tape rule blade and, furthermore, the rewinding speed increases in proportion to the length the tape rule blade is extended, if the said ruler blade is constructed of metal, the user is susceptible to cutaneous injuries of the hand, which is an inconvenient shortcoming of the conventional tape rule. Furthermore, the faster the rewinding speed, the greater the impact force of the tape rule hook against the bumper block, and since the cushioning performance of the conventional bumper block structure is not optimal, the tape rule hook often becomes dislodged, a serious drawback that renders the conventional tape rule unusable. However, to innovate a more practical and convenient tape rule, the inventor of the invention herein conducted exhaustive research and development based on many years of professional manufacturing experience and, furthermore, subjected the results to extensive testing and further refinement to achieve an even higher level of practical value, which finally culminated in the dual mode tape rule blade arrestor structure of the invention herein.

SUMMARY OF THE INVENTION

The primary objective of the invention herein is to provide a dual mode tape rule blade arrestor structure, wherein the arrestor button is pressed upward to temporarily halt tape rule rewinding and, furthermore, the arrestor button is pressed downward and locked into the full constraint position to increase buffering efficiency and decrease rewinding impact force, the improved structure thereby enhancing tape rule operation safety as well as service life.

To enable the examination committee to further understand the structural characteristics and technological content as well as the advantages and innovative features of the invention herein, the brief description of the drawings below is followed by the detailed description of the invention herein.

DETAILED DESCRIPTION OF THE INVENTION

Figure 1:
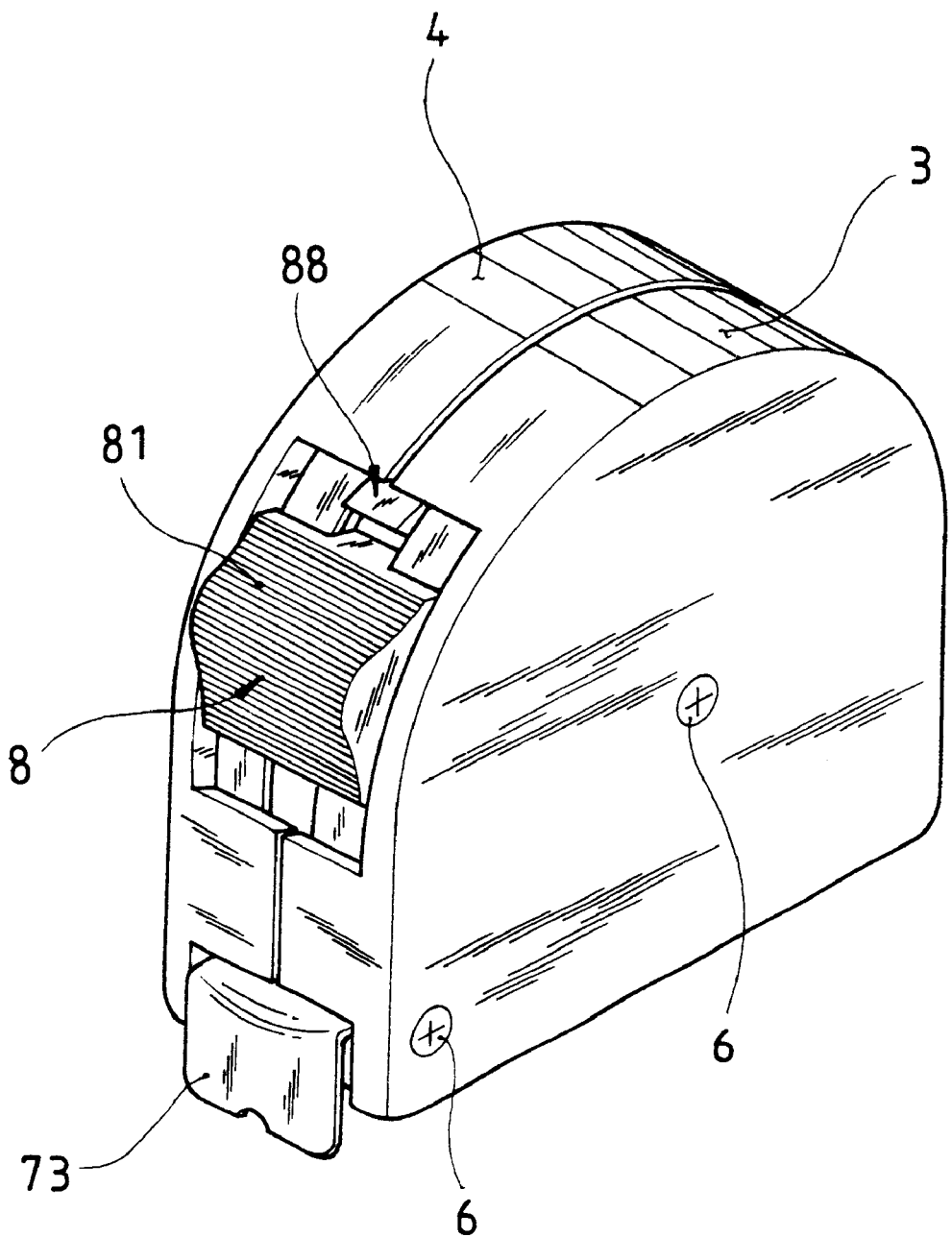
FIG. 1 is an isometric drawing of the invention herein.
Figure 2:
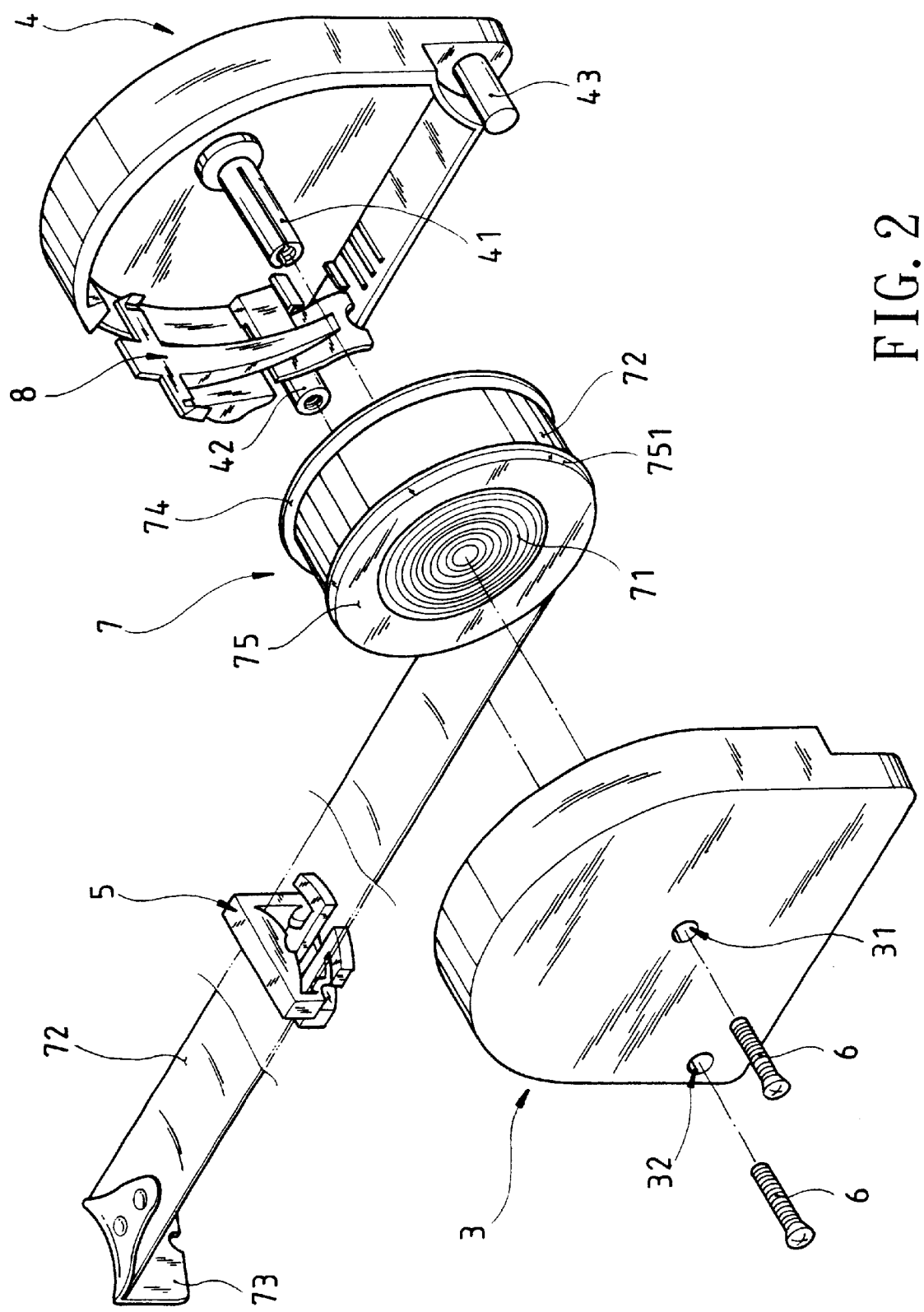
FIG. 2 is an exploded drawing of the invention herein.
Figure 3:
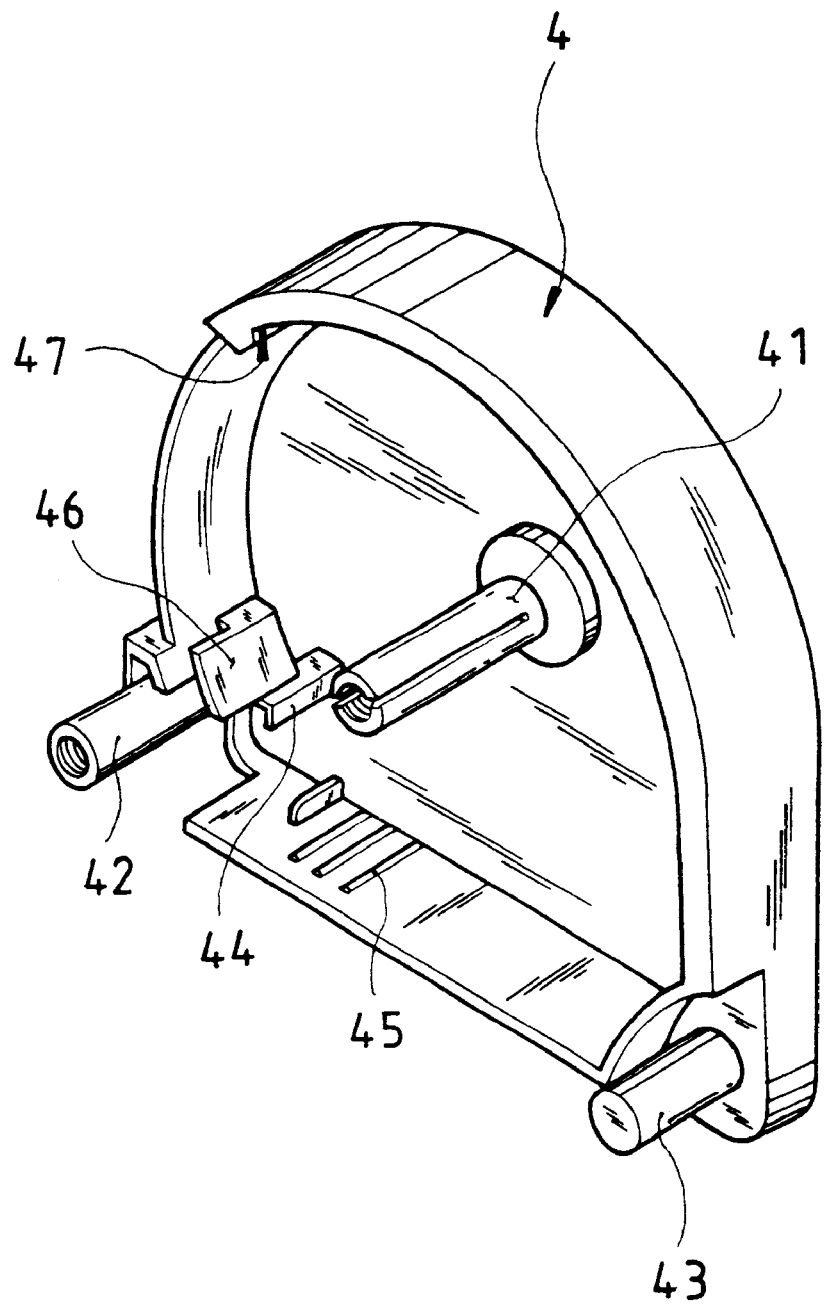
FIG. 3 is an isometric drawing of the left case half 4 of the invention herein.
Figure 4:
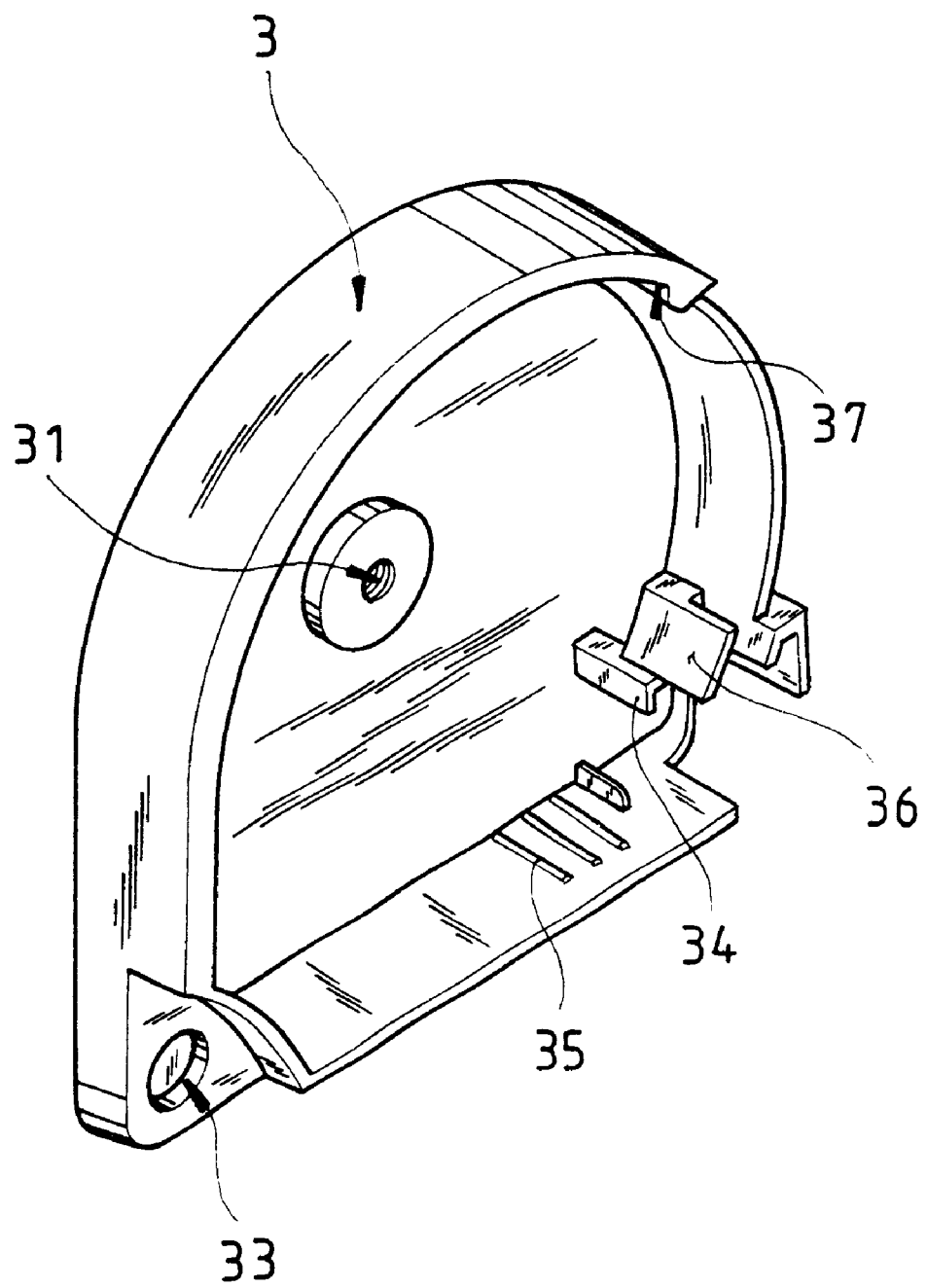
FIG. 4 is an isometric drawing of the right case half 3 of the invention herein.
Figure 5:
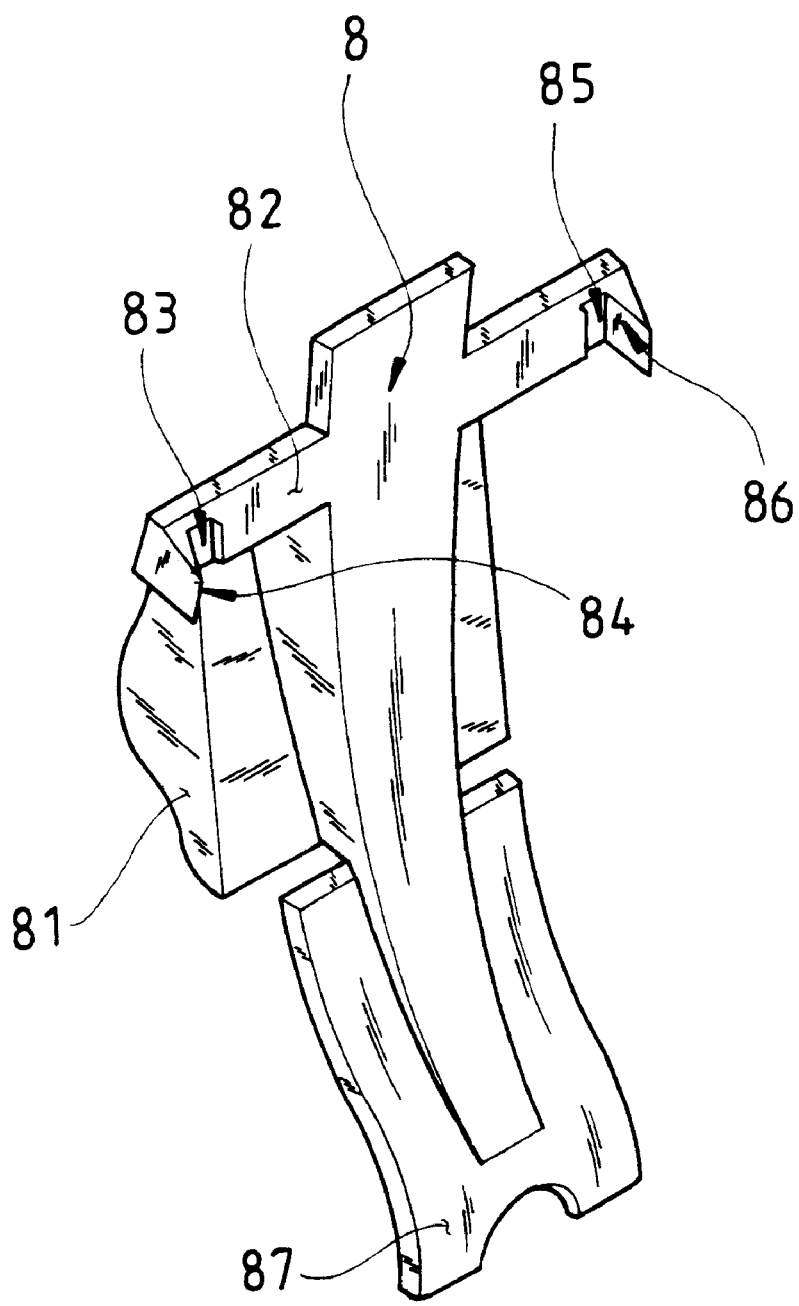
FIG. 5 is an isometric drawing of the arrestor button 8 of the invention herein.

Referring to FIG. 1, FIG. 2, FIG. 3, FIG. 4, and FIG. 5, the dual mode tape rule blade arrestor structure of the invention herein is comprised of a right case half 3, a left case half 4, a bumper block 5, a tape rule blade reel 7, and an arrestor button 8, of which:

The left case half 4 is of one-piece plastic construction; the said left case half 4 has a center shaft 41 projecting from the middle of the interior and, furthermore, a tapped mounting post 42 projecting from the lower front end of the interior, a mounting post 43 projecting from lower rear end of the interior, a fastening tab 44 disposed at the lower end of the said tapped mounting post 42, and a plurality of ribs 45 protruding along the lower surface of the said left case half 4 interior; additionally, an arced mounting fixture 46 extends between the tapped mounting post 42 and the fastening tab 44, and a fastening slot 47 is formed in the upper edge of the said left case half 4.

The right case half 3 is of one-piece plastic construction; the right case half 3 has a center screw hole 31 projecting from the middle of the interior and, furthermore, a screw hole 32 formed in the lower front end of the interior, a hole 33 formed at the lower rear end of the interior, a fastening tab 34 disposed at the lower end of the said screw hole 32, and a plurality of ribs 35 protruding along the lower surface of the said right case half 3 interior; additionally, an arced mounting fixture 36 extends between the screw hole 32 and the fastening tab 34, and a fastening slot 37 is formed into the upper edge of the said right case half 3.

The tape rule blade reel 7 consists of a center-wound spiral spring 71 installed at the middle of the interior with a tape rule blade 72 wound around its exterior section, a tape rule hook 73 riveted to the front end of the tape rule blade 72, and a rim 74 and 75 along each of the two sides of the tape rule blade reel 7, with a beveled surface 751 formed laterally along the outer edges of the said rims 74 and 75.

The arrestor button 8 is of one-piece plastic construction with a push block 81 projecting from the exterior center section and the said arrestor button 8 has a temporary stop appendage 82; an engagement slot 83 and 85 is disposed in each of the two sides of the temporary stop appendage 82 and, furthermore, an angled surface 84 and 86 is formed at each of the outer sides of the said engagement slots 83 and 85; a stay element 87 extends from the lower aspect of the said arrestor button 8 and, furthermore, a curved thrust pad 88 protrudes along the exterior center surface of the temporary stop appendage 82.

The spiral spring 71 of the tape rule blade reel 7 is sleeved onto the center shaft 41 of the left case half 4 and the front end of the tape rule blade 72 is inserted though the bumper block 5 which is secured to the fastening tab 44 in the bottom section at the front end of the left case half 4; one side of the said arrestor button 8 is inserted and positioned into the arced mounting fixture 46 of the left case half 4; the right case half 3 is then placed over such that the other side of the said bumper block 5 is secured to the fastening tab 34 in the bottom section at the front end of the right case half 3 and, furthermore, the other side of the said arrestor button 8 is inserted and positioned into the arced mounting fixture 36 of the right case half 3; two screws 2 are respectively inserted into the center screw hole 31 and the screw hole 32 and fastened to the center shaft 41 and the tapped mounting post 42 of the left case half 4 to conjoin the tape rule into a single structural entity.

As to the said structural component assembly of the invention herein, the said tape rule blade 72 is pulled out for utilization and released when utilization is completed; since the spiral spring 71 inside the tape rule blade reel 7 is capable of automatically rewinding the tape rule blade 72, when the tape rule blade 72 is being rewound, the user moves the arrestor button 8 upward and presses it inward, causing the engagement slots 83 and 85 and the angled surfaces 84 and 86 at the two sides of the temporary stop appendage 82 to make frictional contact with the rims 74 and 75 along the two sides of the tape rule blade reel 7 and thereby achieving transient rewind buffering or the arrestor button 8 is pressed downward until the it is locked into the full constraint position against the tape rule blade 72; as such, the arrestor button 8 of the invention herein is simultaneously capable of two arrestive modes.

In summation of the foregoing section, the invention herein effectively improves upon the shortcomings of the conventional product and in terms of application is genuinely an original innovation compared to similar category products and, furthermore, is of greater utilitarian performance. Since the disclosed structure is capable of achieving the claimed objectives, the invention herein is submitted to the examination committee for review in application for the granting of the commensurate patent rights.

What is claimed is:

1. A dual mode tape rule blade arrestor structure comprised of a right case half, a left case half, a bumper block, a tape rule blade reel, and an arrestor button, of which:

The said left case half is of one-piece plastic construction; the said left case half has a center shaft projecting from the middle of the interior and, furthermore, a tapped mounting post projecting from the lower front end of the interior, a mounting post projecting from lower rear end of the interior, a fastening tab disposed at the lower end of the said tapped mounting post, and a plurality of ribs protruding along the lower surface of the said left case half interior; additionally, an arced mounting fixture extends between the said tapped mounting post and the said fastening tab, and a fastening slot is formed into the upper edge of the said left case half;

The said right case half is of one-piece plastic construction; the said right case half has a center screw hole projecting from the middle of the interior and, furthermore, a screw hole formed in the lower front end of the interior, a hole formed at the lower rear end of the interior, a fastening tab disposed at the lower end of the said screw hole, and a plurality of ribs protruding along the lower surface of the said right case half interior; additionally, an arced mounting fixture extends between the screw hole and the said fastening tab, and a fastening slot is formed in the upper edge of the said right case half;

The said tape rule blade reel consists of a center-wound spiral spring installed at the middle of the interior with a tape rule blade wound around its exterior section, a tape rule hook riveted to the front end of the tape rule blade, and a rim along each of the two sides of the said tape rule blade reel, with a beveled surface formed laterally along the outer edges of the said rims;

The said arrestor button is of one-piece plastic construction with a push block projecting from the exterior center section and the said arrestor button has a temporary stop appendage; an engagement slot is disposed in each of the two sides of the said temporary stop appendage and, furthermore, an angled surface is formed at each of the outer sides of the said engagement slots; a stay element extends from the lower aspect of the said arrestor button and; furthermore, a curved thrust pad protrudes along the exterior center surface of the said temporary stop appendage;

The said spiral spring of the said tape rule blade reel is sleeved onto the said center shaft of the said left case half and the front end of the said tape rule blade is inserted though the said bumper block which is secured to the said fastening tab in the bottom section at the front end of the said left case half; one side of the said arrestor button is inserted and positioned into the said arced mounting fixture of the said left case half; the said right case half is then placed over such that the other side of the said bumper block is secured to the said fastening tab in the bottom section at the front end of the said right case half and, furthermore, the other side of the said arrestor button is inserted and positioned into the said arced mounting fixture of the said right case half; two screws are respectively inserted into the said center screw hole and the said screw hole and fastened to the said center shaft and the said tapped mounting post of the said left case half to conjoin the tape rule of the present invention into a single structural entity.

* * * * *